(12) United States Patent
Tong et al.

(10) Patent No.: US 11,544,443 B2
(45) Date of Patent: Jan. 3, 2023

(54) TIME INFORMATION CODING METHOD, CODED VALUE SEARCHING METHOD, DECODING METHOD AND DEVICE

(71) Applicant: Xiaochong Tong, Henan (CN)

(72) Inventors: Xiaochong Tong, Henan (CN); Rong Wang, Henan (CN); Yong Zhang, Henan (CN); Chengqi Cheng, Henan (CN); Guangling Lai, Henan (CN); Congzhou Guo, Henan (CN); He Li, Henan (CN); Yi Lei, Henan (CN); Wen Cao, Henan (CN); Xiangyu Wu, Henan (CN)

(73) Assignee: Xiaochong Tong, Henan (CN)

( * ) Notice: Subject to any disclaimer, the term of this patent is extended or adjusted under 35 U.S.C. 154(b) by 809 days.

(21) Appl. No.: 16/312,980

(22) PCT Filed: Nov. 28, 2016

(86) PCT No.: PCT/CN2016/107461
§ 371 (c)(1),
(2) Date: Dec. 21, 2018

(87) PCT Pub. No.: WO2018/000709
PCT Pub. Date: Jan. 4, 2018

(65) Prior Publication Data
US 2019/0163727 A1 May 30, 2019

(30) Foreign Application Priority Data

Jun. 30, 2016 (CN) .......................... 201610509377.9

(51) Int. Cl.
*G06F 40/126* (2020.01)
*G06F 16/11* (2019.01)
(Continued)

(52) U.S. Cl.
CPC ............ *G06F 40/126* (2020.01); *G06F 16/11* (2019.01); *G06F 16/13* (2019.01);
(Continued)

(58) Field of Classification Search
CPC .... G06F 16/11; G06F 16/489; G06F 16/2246; G06F 16/2455; G06F 16/13; G06F 40/126
See application file for complete search history.

(56) References Cited

U.S. PATENT DOCUMENTS 5,912,869 A * 6/1999 Tanaka ............... G11B 27/3027
369/59.23
6,061,398 A * 5/2000 Satoh ..................... G06T 9/005
341/65
(Continued)

FOREIGN PATENT DOCUMENTS

CN 104090949 A 10/2014
CN 104091054 A 10/2014
(Continued)

*Primary Examiner* — Robert W Beausoliel, Jr.
*Assistant Examiner* — Susan F Rayyan
(74) *Attorney, Agent, or Firm* — IceMiller LLP

(57) ABSTRACT

A time information coding method is provided, to solve the problem of coded values low calculation efficiency, which is resulted by adopting the existing time information coding schemes. The method comprises: determining time information to be coded; coding the time information to be coded to a first integer with a specified number of bits under a first time scale; coding the first integer into a second integer with a specified number of bits under a second time scale, the second integer being as a coded value under the second time scale of the time information to be coded. A time information coding device, a searching method for coded values, a decoding method and device are also provided.

17 Claims, 6 Drawing Sheets

(51) Int. Cl.
  *G06F 16/48* (2019.01)
  *G06F 16/22* (2019.01)
  *G06F 16/2455* (2019.01)
  *G06F 16/13* (2019.01)

(52) U.S. Cl.
  CPC ...... *G06F 16/2246* (2019.01); *G06F 16/2455* (2019.01); *G06F 16/489* (2019.01)

(56) References Cited

U.S. PATENT DOCUMENTS

| | | | | |
|---|---|---|---|---|
| 2004/0215647 | A1* | 10/2004 | Fam | G06F 40/126 |
| 2006/0074971 | A1* | 4/2006 | Groenveld | G06F 16/20 |
| 2009/0193045 | A1* | 7/2009 | Werner | H03M 7/30 |
| 2013/0004142 | A1* | 1/2013 | Grab | H04N 21/25816 |
| | | | | 386/259 |
| 2013/0223583 | A1* | 8/2013 | Garcia | H03K 21/023 |
| | | | | 377/51 |
| 2016/0043823 | A1* | 2/2016 | Zhao | H04J 3/0697 |
| | | | | 370/350 |
| 2017/0092236 | A1* | 3/2017 | Tripathi | G06F 3/147 |
| 2017/0132206 | A1* | 5/2017 | Kumagai | G06F 40/295 |

FOREIGN PATENT DOCUMENTS

| | | | |
|---|---|---|---|
| CN | 104462932 A | 3/2015 | |
| CN | 105404472 A | 3/2016 | |
| CN | 106126486 A | 11/2016 | |

* cited by examiner

TIME INFORMATION CODING METHOD, CODED VALUE SEARCHING METHOD, DECODING METHOD AND DEVICE

CROSS-REFERENCE TO RELATED APPLICATIONS

This application is a National Stage of International patent application PCT/CN2016/107461, filed on Nov. 28, 2016, which claims priority to foreign Chinese patent application No. CN 201610509377.9, filed on Jun. 30, 2016, the disclosures of which are incorporated by reference in their entirety.

TECHNICAL FIELD

The present application disclosure relates to the computer technology and geographic information field, specially to a time information coding method, a coded value searching method, a decoding method and device.

BACKGROUND

Currently, the representation of time (time information) can be roughly divided into two kinds: textual representation and numerical representation. In terms of textual representation of time, there are distinct differences between various countries and regions, given the differences between languages, cultures, histories and habits of different countries. There are also different ways of representing in different regions of the world in terms of digital representation of time. The generalized time is divided into two parts: a date portion and a time portion (specifically the specific time within a day). The order in which the hour, minute, and second is displayed in time representation is usually consistent: if H represents the hour, M represents the minute, S represents the second, then the time portion is represented as H:M:S. The biggest differences between time representations are generally embodied in the display of dates, as the year, month, and day may have different arrangements: if Y represents the year, M represents the month, D represents the day, then the possible arrangements for the date portion are as listed below:

YMD: (year, month, day), such as 1996-04-22
DMY: (day, month, year), such as 22.04.96 or 22/04/96
MDY: (month, day, year), such as 04/22/96

The discretization of time information refers to the representation of time information by means of discrete forms. When a time information is represented in such a discrete form, each bit of the time information is a discrete time point rather than a continuous time segment in terms of its representation. For example, "1996-04-22" is a discrete time point, in which the "day" is the time granularity of the representation, as another example, "1996-04-22, 10:22" is also a discrete time point, in which the "minute" is the time granularity of the representation. There are three main categories of time information discretization, i.e. discretization of time within filesystems, programming languages and databases.

Since the filesystems, programming languages and databases are all available for computer operations (such as accessing or running, etc.), as a result, the time information within the filesystems, programming languages and databases, generally refers to the time information which is coded into coded values that can be identified by computers.

The coding of time information is referred as time information coding. In particular, time information coding refers to the procedure in which preset rules are used to convert the time information from texts, numbers, or other forms of representation into the forms that can be identified by computers. The result of time information coding is the time information that is stored as values (also known as coded values) in computers. The time information coding models mentioned in below refer to the models that contain methods used to code time information.

(1) The Discretization of Time in Filesystems

The time information coding models in filesystems are mainly applied to the storage and management of the time attributes of the file (the time attribute of a file is a type of the time information). The time attributes of the file generally include the creation time, modification time, and access time of the file.

In different filesystems, the time attributes of the file are usually coded by means of different methods. However, the basic methods can be categorized into two types: one type divides the binary bits of a byte into different regions, and separately uses these regions to store the information of year, month, day, minute, minute, second etc; the other type uses an integer to record the number of seconds elapsed from a reference time point up to the current time. Moreover, the time coding in filesystems shows a trend in which the range and precision of the represented time can be increased by increasing the storage space.

(2) The Discretization of Time in Programming Languages

Programming languages need to process time. Since there are differences in characteristics of various programming languages, the specific coding methods of time information are also different, however, the basic methods can be summarized as the following four categories:

1) Using a signed integer to record the number of seconds elapsed from a reference time up to the current time, not including the leap seconds that were inserted to adjust the time.

2) Using a signed integer to represent the clock ticks from the start of a program, which is a relative measure of time.

3) Dividing the binary bits of a byte into different regions and storing information about year, month, day, time, minute, second etc.

4) Using a tuple, struct or some other form of composite data type to display and decompose time.

(3) The discretization of time in the databases

SQL: 2011 standard (also known as ISO/IEC 9705:2011) specifies data types for date and time, including the following data types:

DATE: the date, which consists of year, month and day.
TIME: the time, which consists of hour, minute and second.
TIMESTAMP: a timestamp that consists of DATE and TIME.
TIME WITH TIME ZONE: an expansion of TIME that includes timezone information.
TIMESTAMP WITH TIME ZONE: an expansion of TIMESTAMP that includes timezone information.
INTERVAL: the time interval which may be years and months or days. The former includes the YEAR and MONTH fields; while the latter includes DAY, HOUR, MINUTE and SECOND elements.

The database system generally supports the aforementioned data types, but the implementation varies with each type of different database systems.

In the field of computer technology, the existence of time information is of significance, data collection is relevant with time information, data querying and searching or mining analysis is even more closely connected with time information. For example, each data stored in a data warehouse comprises time logs; research on sales, stocks, meteorology, floods, earthquakes and other data changes and knowledge discovery issues are all associated with the time information, etc.

However, in the big data environment, due to massive quantities of data with time information and their complexity and variable time structure, it is difficult for the existing time information coding to accurately and efficiently carry out the data organization and calculation based on the time information. Specifically, for multi-scale time information, according to the existing time information coding method, there will be the following defections. To be specific, "multi-scale time information" described here is a kind of time information which contains at least two time information to be separately represented in different time scales (it is easy to distinguish, and it also can be referred as sub-time information). For example, January 2038 is a kind of multi-scale time information, because, firstly, it is a kind of time information, secondly, it consists of two time information, which can be separately represented in different time scales, respectively, one time information is "Year 2038", which is represented by time scale "Year", and the other time information is "January 2038", which is represented by the time scale "Month"; as another example, "May 1, 15:20" is a multi-scale time information, because, firstly, it is a kind of time information, secondly, it contains of four time information, which can be represented by "Month", "Day", "Hour" or "Minute", i.e. "May", "May 1", "May 1, 15 o'clock" and "May 1, 15:20".

The above-mentioned defections are as follows:

By using the existing time information coding method, the calculation efficiency of the coded value corresponding to the multi-scale time information may be relative low.

For example, current methods for storing and organizing multi-scale time information is to code multi-scale time information into a string and store, for instance, multi-scale time information "9:30 pm at night on Dec. 12, 2015" is coded into a string "2015-12-12 T 21:30:00". Coding the multi-scale time information into a string will record the multi-scale time information in a simple and intuitive manner, but it may cause significant calculation disadvantages of the string as coded value. For example, when the string "2015-12-31" is added 1 day, following steps should be performed: decoding the string at first; extracting year 2015, month 12, and day 31; adding 1 day according to the calendar rule, as the calculation result, the year becomes 2016, the month becomes 1, the day becomes 1; and coding the calculation result into the string "2016-01-01". The process is cumbersome and complex, time-consuming and inefficient.

SUMMARY

An embodiment of the present application provides a time information coding method, to solve the low calculation efficiency of coded value caused by the existing time information coding methods.

An embodiment of the application further provides a time information coding device, to solve the low calculation efficiency of coded value caused by the existing time information coding methods.

An embodiment of the application further provides a coded value searching method, decoding method and device.

The embodiments of the present application adopt the following technical schemes:

A time information coding method, comprises:
determining a time information to be coded;
coding the time information to be coded into a first integer with a specified number of bits under a first time scale;
coding the first integer into a second integer with a specified number of bits under a second time scale, as a coded value of the time information to be coded under the second time scale, according to information of the second time scale.

A coded value searching method based on the preceding time information coding method, comprises:
determining a coded value with a specified number of bits;
determining a time scale information corresponding to the coded value with the specified number of bits;
searching for a target coded value corresponding to the coded value with the specified number of bits, according to the time scale information corresponding to the coded value with the specified number of bits;
wherein, the target coded value and the coded value with the specified number of bits are obtained by coding same time information through the time information coding method.

A decoding method based on the preceding time information coding method, comprises:
determining a coded value to be decoded with a specified number of bits;
determining a time scale information corresponding to the coded value to be decoded;
decoding the coded value to be decoded into the corresponding time information, according to the time scale information corresponding to the coded value to be decoded and the specified number of bits.

A time information coding device, comprises:
a time information determining unit, for determining a time information to be coded;
a coding unit, for coding the time information to be coded into a first integer with a specified number of bits under a first time scale; and coding the first integer into a second integer with a specified number of bits under a second time scale, as a coded value of the time information to be coded under the second time scale, according to information of the second time scale.

A coded value searching device, comprises:
a coded value determining unit, for determining a coded value with a specified number of bits;
a time scale determining unit, for determining a time scale information corresponding to the coded value with the specified number of bits;
searching unit, for searching for a target coded value corresponding to the coded value with the specified number of bits, according to the time scale information corresponding to the coded value with the specified number of bits;
wherein, the target coded value and the coded value with the specified number of bits are obtained by coding same time information through the time information coding method.

A decoding device, comprises:
a coded value determining unit, for determining a coded value to be decoded with a specified number of bits;
a time scale determining unit, for determining a time scale information corresponding to the coded value to be decoded;
a decoding implementation unit, for decoding the coded value to be decoded into the corresponding time information, according to the time scale information corresponding to the coded value to be decoded and the specified number of bits.

The embodiments of the application adopt at least one of the aforementioned technical schemes to achieve the following advantageous technical effects:

Since the coded values obtained by adopting the technical schemes of the application are integers, the calculation efficiency based on integers is higher than the calculation efficiency based on strings, and thus compared with the existing technical schemes, in which the time information is coded into strings, the present application could improve the calculation efficiency of coded value.

BRIEF DESCRIPTION OF THE DRAWINGS

The appended drawings described herein are intended to provide further understandings of the present application, and constitute a part of the present application, the embodiments of the present application are shown to explain the present application, but do not constitute any improper limitation to the present application. In the drawings.

DETAILED EMBODIMENTS

In order to make the purposes, technical schemes and advantages of the application more clear, the technical schemes will be clearly and completely described hereinafter with the specific embodiment and corresponding drawings of the application. Obviously, the embodiments described herein are only a part but not all of the embodiments of the application. Based on the embodiments of the application, all other embodiments obtained by the person skilled in the art without creative efforts fall within the protection scope of the application.

Embodiment 1

Figure 1:
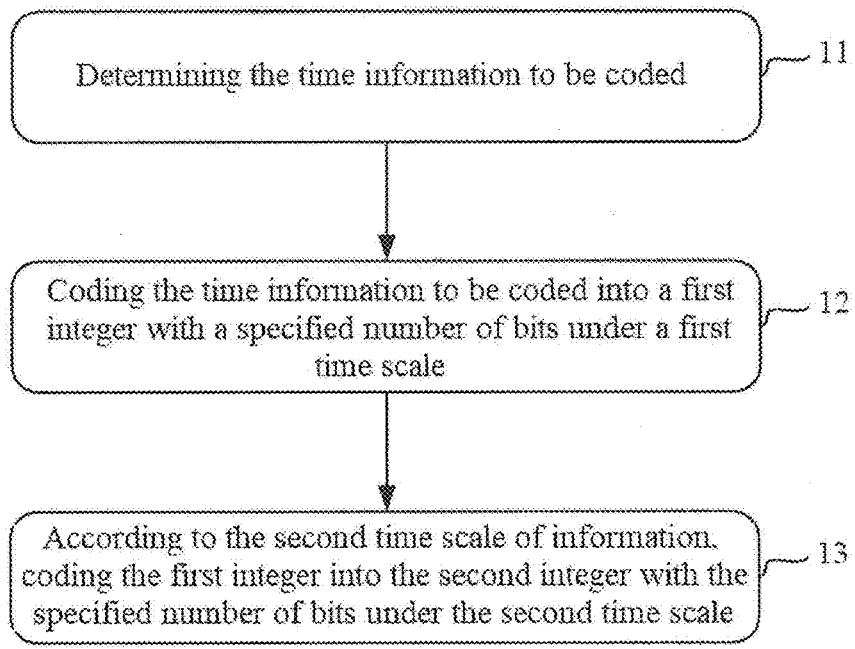
FIG. 1 illustrates a schematic flow diagram of a time information coding method according to one embodiment of the application.

In order to solve the problem of the low efficiency of the coded value caused by the existing time information coding method, the application embodiment provides a time information coding method as shown in FIG. 1. The implementation procedure of this method includes the following steps:

Step 11, determining the time information to be coded.

For example, in case of the Gregorian and Coordinated Universal Time (UTC) system, the time information described here can be represented in the form of AD A B C D:E:F.GH. Wherein, A represents the year, B represents the month, C represents the day, D represents the hour, E represents the minute, F represents the second, G represents the millisecond, and H represents the microsecond.

Step 12, coding the time information to be coded into a first integer with a specified number of bits under a first time scale.

Wherein, the predetermined coding rule may include: the coded value corresponding to the designated contents included in the time information to be coded occupies 46 bits in total. The designated contents comprise the time information with the time granularity such as month, day, hour, minute, second, millisecond and microsecond.

For example, the predetermined coding rule may include following contents:
coding the time information to be coded with the granularity "month" into a 4 bits binary;
coding the time information to be coded with the granularity "day" into a 5 bits binary;
coding the time information to be coded with the granularity "hour" into a 5 bits binary;
coding the time information to be coded with the granularity "minute" into a 6 bits binary;
coding the time information to be coded with the granularity "second" into a 6 bits binary;
coding the time information to be coded with the granularity "millisecond" into a 10 bits binary;
coding the time information to be coded with the granularity "microsecond" into a 10 bits binary.

If the first integer with 64 bits is expected, in addition to the above listed contents, the coding rule further comprises:
coding the time information to be coded with the granularity "year" into a 18 bits binary.

The following example illustrates the implementation of step 12:

Take the time information "AD 2016, May 14, 15:30:23, 870 milliseconds 124 microseconds" to be coded as an example, wherein the specified number of bits is 64 bits, according to the predetermined coding rule, the coded values under the first time scale could be obtained, as shown in table 1:

TABLE 1

| unit | value | coded by integer (binary) | unit | value | coded by integer (binary) |
|---|---|---|---|---|---|
| year | 2016 | 11111100000 (seven "0"s in the high position are omitted) | minute | 30 | 011110 |

TABLE 1-continued

| unit | value | coded by integer (binary) | unit | value | coded by integer (binary) |
|---|---|---|---|---|---|
| month | 5 | 0101 | second | 23 | 010111 |
| day | 14 | 01110 | millisecond | 870 | 1101100110 |
| hour | 15 | 01111 | microsecond | 124 | 0001111100 |
| coded value Tc in the single time scale (integer) | | $(1111110000001010111001110111001011111011001100001111100)_2$ $(141887369102858364)_{10}$ | | | |

Besides, for the first time scale in step 12, in the embodiment of the application, the first time scale could be the binary maximum bits which the calculation device could calculate at one time (32 bits, or 64 bits, etc.), and the minimum time scale among the determined plurality of time scales. The calculation device described here refers to the performing part of the time coding method, for example, it could be a computer, or some calculating devices with CPU or MCPU.

For the above example shown in the table 1, the first time scale described here is the time scale of B.C. 131072~AD 131071, (i.e. $[-2^{17}, 2^{17}-1]$).

In the embodiment of the application, in order to support respectively coding the time information to be coded into the coded values in so many different time scales as possible, it is considered to make full use of the binary bits processed by the calculation device in a single operation, to map different time scales.

For instance, take the computer which could calculate maximal 64 bits binary at one time (referred as 64 bits computer) as an example, in the embodiment of the application, 63 time scales in which contain the first time scale could be set, please refer to following table 2. In the case of presetting 63 time scales shown in table 2, in the embodiment of the application, the information of the second time scale could be at least one of the 63 time scale information shown in table 2. Specifically, depending on the actual coding requirements, the information of the second time scale could be for example all 63 time scales shown in table 2, etc.

Step 13, according to the time scale of information, coding the first integer into the second integer with the specified number of bits under the second time scale, as the coded value under the second time scale of the time information to be coded.

The information of the second time scale can be the coding level N corresponding to the second time scale. When the information of the second time scale is the coding level N, the specific implementation of step 13 may include the following steps:

left-shifting the first integer Tc by 1 bit to obtain the left-shifted first integer Tc;
calculating DetaT according to DetaT=1<<(63−N), on the basis of the coding level N;
calculating MTc according to MTc=(T'c>>(64−N))<< (64−N)+DetaT−1, and taking the calculated MTc as the second integer.

In the embodiment of the application, after coding the time information to be coded into the second integer with the specified number of bits, in order to facilitate the searching for the second integer, the method as shown in FIG. 1 may also include:

saving the second integer locally; or sending the second integer to the data storage (such as a database or filesystem, etc.) to be stored in the data storage.

Since the coded values obtained by adopting the technical schemes of the present application are integers, the calculation efficiency based on integers is higher than the calculation efficiency based on strings, and thus compared with the existing technical schemes, in which the time information is coded into strings, the present application could improve the calculation efficiency of coded value.

Figure 2:
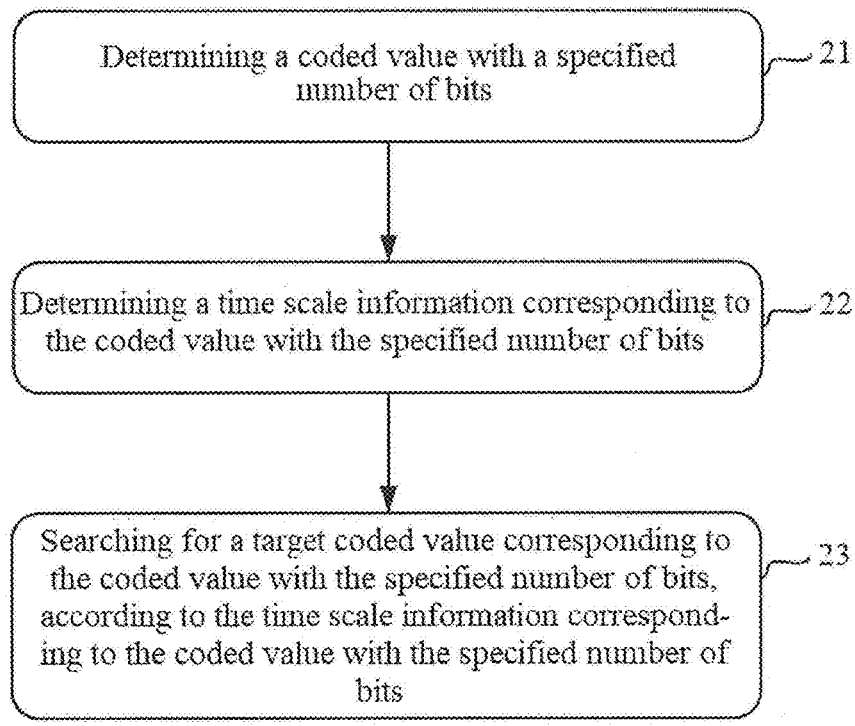
FIG. 2 illustrates a schematic flow diagram of a coded value searching method according to one embodiment of the application.

Based on the time information encoding method as shown in FIG. 1, the embodiment of the present application further provides a coded value searching method, and the method comprises the following steps as shown in FIG. 2:

Step 21, determining a coded value with a specified number of bits.

For example, it is possible to determine the coded value with specified number of bits, which is designated by the user. The specified number of bits described here, for example, could be 64 bits.

Step 22, determining a time scale information corresponding to the coded value with the specified number of bits.

The time scale information described here, for example, could be the coding level information corresponding to the time scale information.

Step 23, searching for a target coded value corresponding to the coded value with the specified number of bits, according to the time scale information corresponding to the coded value with the specified number of bits.

Wherein, the target coded value and the coded value with the specified number of bits are obtained by coding same time information through the time information encoding method.

For the particular implementation of step 23, depending on the different target coded values to be searched, the step 23 may at least be implemented in the following two ways:

The first way: according to the time scale information corresponding to the coded value with the specified number of bits, searching for the coded value whose corresponding time scale is lower than the time scale corresponding to the coded value with the specified number of bits, i.e. searching for the coded value whose corresponding coding level is higher than the coding level corresponding to the coded value with the specified number of bits.

The second way: according to the time scale information corresponding to the coded value with the specified number of bits, searching for the coded value whose corresponding time scale is higher than the time scale corresponding to the coded value with the specified number of bits, i.e. searching for the coded value whose corresponding coding level is lower than the coding level corresponding to the coded value with the specified number of bits.

The above listed implementation could both refer to the detailed description of embodiment 2, their details are not more described in embodiment 1 of the present invention.

In the embodiment of the present application, the performing part of step 21-23 could be a computer, after searching results are obtained, it can output the searching results, for example, output to the display screen of the computer to display, or output to the other devices connected with the computer, or send to the server which is established a connection with the computer, etc. For step 23, the computer may not search for the target coded value, but calculate the searching base for the target coded value (for example the interval [A, B] in embodiment 2) according to the time scale information corresponding to the coded value with the specified number of bits, and sends the searching base to other devices (for example, the server of the database for saving the coded values), to enable the other devices to search for the target coded value based on the searching base.

Figure 3:
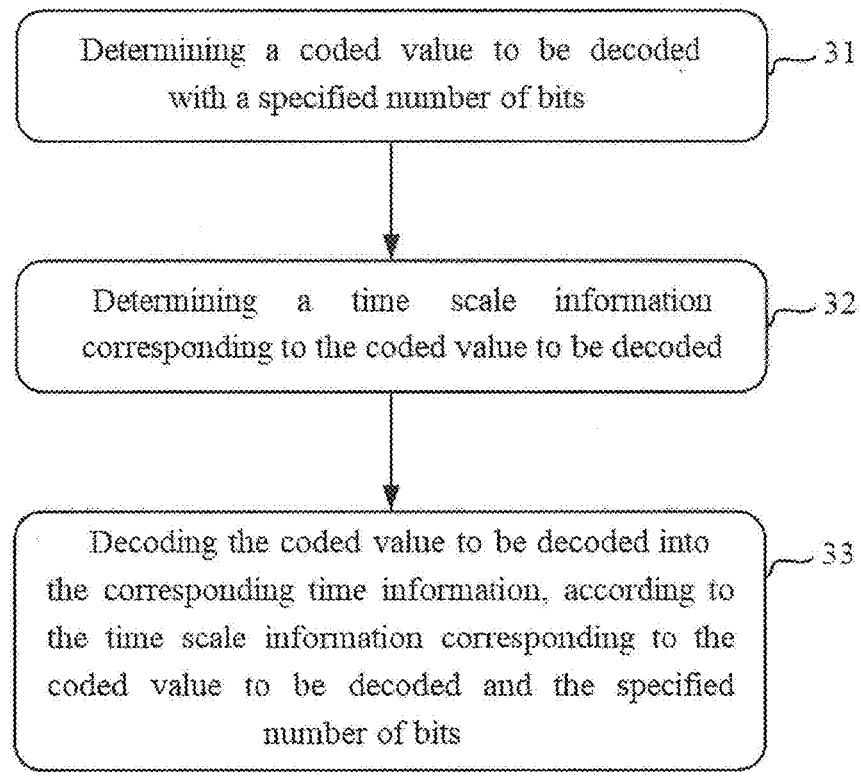
FIG. 3 illustrates a schematic flow diagram of a decoding method according to one embodiment of the application.

Based on the time information coding method provided by the embodiment of the present application, the embodiment of the present application provides a decoding method, its implementation flow diagram is shown in FIG. 3, the method comprises the following steps:

Step 31, determining a coded value to be decoded with a specified number of bits;

Step 32, determining a time scale information corresponding to the coded value to be decoded;

Step 33, decoding the coded value to be decoded into the corresponding time information, according to the time scale information corresponding to the coded value to be decoded and the specified number of bits.

In the embodiment of the present application, the time information obtained by decoding, could be saved, output, or displayed.

In the embodiment of the present application, the specific implementation of step 32 may comprise:
  determining the parity of a coded value to be decoded;
  if it is determined that the coded value to be decoded is odd, calculating Mid according to Mid=(MTc−1)^(MTc+1), wherein, MTc is the coded value to be decoded;
  for Mid, in the case of initial N=0 and the value of variable i is in the range of [1, n], performing the following cycle operation until the value of variable i decreases from n to 1, and in the case of i=1, after the corresponding value of N as the time scale information corresponding to the coded value with the specified number of bits is calculated, stopping the cycle operation.

The cycle operation includes:
obtaining the high position of Mid by the masking $(2^i - \Sigma_{k=0}^{2^{i-1}-1} 2^{2^{i-1}-k} -1)$, right-shifting by $2^{i-1}$ bits to obtain Mid0, determining whether Mid0 is 0; if Mid0 is not 0 at this point, then Mid=Mid0, and keeping N unchanged, and then performing the next cycle; if Mid0 is 0 at this point, then performing a mask calculation, i.e. Mid=Mid&$(\Sigma_{k=0}^{2^{i-1}-1} 2^{2^{i-1}-k})$, N=N+$2^{i-1}$, and then performing the next cycle.

For details about how to perform the cycle operation, please refer to the detailed description in embodiment 2, here will not describe it any more.

The advantageous technical effects provided by the embodiment 1 of the present application is that: since the coded values obtained by adopting the technical schemes of the present application are integers, the calculation efficiency based on integers is higher than the calculation efficiency based on strings, and thus compared with the existing technical schemes, in which the time information is coded into strings, the present application could improve the calculation efficiency of coded value.

Embodiment 2

Based on the thoughts of the present application, which are described in detail in the foregoing embodiment 1, in order to facilitate a better understanding of the technical features, means and effects of the present application, a time information coding method provided by the present application is further described in below, to form another embodiment of the present application.

In the embodiment 2 of the present application, the following systems are selected from the widely used systems in the world as the coding design base for time information coding method:

(1) Calendar system: using the Gregorian calendar, i.e. the civil calendar.
(2) Time system: using UTC system.

Based on the selected calendar system and time system, the time information to be coded can be recorded as follows:

AD A B C D:E:F.GH

Wherein, A represents the year. B represents the month, C represents the day, D represents the hour, E represents the minute, F represents the second, F represents the millisecond, and H represents microsecond.

Figure 4:
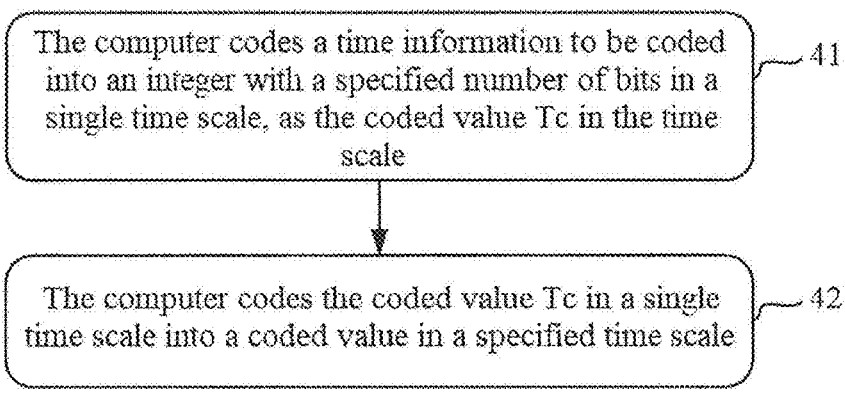
FIG. 4 illustrates a schematic flow diagram of the process of coding the time information to be coded in the second embodiment.

As shown in FIG. 4, the schematic flow diagram for coding the time information to be coded in the embodiment 2 of the present application, includes the following steps:

Step 41, the computer codes a time information to be coded into an integer with a specified number of bits in a single time scale, as the coded value Tc in the time scale. In this case, the single time scale described here is equivalent to the first time scale mentioned in the embodiment 1 of the present application.

In the embodiment 2 of the present application, assuming that a 64 bits computer will perform the steps shown in FIG. 4, Tc described here can be a 64 bits integer.

In particular, the specific implementation procedure of coding the time information to be encoded into Tc includes the following substeps:

Substep 1: converting each integer A~H in the "AD A B C D:E:F.GH" into corresponding binary numbers, according to the following rules (1)~(8).

(1) The year-counting integer A is converted into a 18 bits binary, in which the first bit is the sign bit, and the converted binary is used to represent one year in 131072 BC~131071 AD.

The complement design described here is that if the "year"-counting integer A is a certain BC year (for example, 220 BC), converting A into 18 bits binary at first while the first bit is the sign bit, and thus converting the integer A into 18 bits binary, and then calculating the complement codes of the 18 bits binary except for the first bit (i.e. the sign bit).

In the embodiment of the present application, if A is a certain BC year, the first bit of the 18 bits binary number is 1. And when calculating the complement codes of the 18 bits number, the sign (negative sign) of the "year"-counting integer is removed at first and the integer is varied to a positive number, and the first bit of its corresponding binary number becomes 0; then the whole binary number is varied directly to a negative number, and its first bit becomes 1. Other 2~18 bits are arranged according to complement.

It is important to note that if the specified number of bits is m, the year-counting integer A can be converted to (m−46) bits binary number, and the first bit is the sign bit, the converted binary number is used to represent a year in $2^{m-46}$ BC~$2^{m-46}-1$ AD. m is an integer greater than 46.

(2) The month-counting integer B is converted into a 4 bits binary number that represents one of the decimal numbers 0~15, in which 0, 13, 14, 15 are invalid months that will be not embodied in the coded value.

(3) The day-counting integer C is converted into a 5 bits binary number that represents one of the decimal numbers 0~31, in which 0 is invalid day count that will be not embodied in the coded value.

(4) The hour-counting integer D is converted into a 5 bits binary number that represents one of the decimal numbers 0~31, in which 24~31 are invalid hour counts that will be not embodied in the coded value.

(5) The minute-counting integer E is converted into a 6 bits binary number that represents one of the decimal numbers 0~63, in which 60~63 are invalid minute counts that will be not embodied in the coded value.

(6) The second-counting integer F is converted into a 6 bits binary number that represents one of the decimal numbers 0~63, in which 60~63 are invalid second counts that will be not embodied in the coded value.

(7) The millisecond-counting integer G is converted into a 10 bits binary number that represents one of the decimal numbers 0~1023, in which 1000~1023 are invalid millisecond counts that will be not embodied in the coded value.

(8) The microsecond-counting integer H is converted into a 10 bits binary number that represents one of the decimal numbers 0~1023, in which 1000~1023 are invalid microsecond counts that will be not embodied in the coded value.

Substep 2: after converting each integer A~H in the "AD A B C D:E:F.GH" into corresponding binary numbers according to the rules (1)~(8), directly performing the memory connections of various integers with different size such as A (18 bits), B (4 bits), C (5 bits), D (5 bits), E (6 bits), F (6 bits), G (10 bits), H (100 bits), to form a 64 bits integer.

The term memory connection as used herein refers to respectively splicing each obtained binary number corresponding to A~H. Since the number of bits of the binary numbers corresponding to A~H is neither 8 bits, i.e. the smallest unit used in traditional computer operation, nor an integer multiple of 8 bits, therefore, the memory connection described here refers to an operation for bit field. In particular, each binary number corresponding to A~H is so spliced, that each number in the bit field occupied by each binary number corresponding to A~H is sequentially spliced, and thus a 64 bits integer is obtained as the splicing result.

It is important to note that if the specified number of bits is m, after converting each integer A~H in the "AD A B C D:E:F.GH" into a corresponding binary number respectively, the integer obtained by directly performing the memory connections of various integers with different size such as A (m−46 bits), B (4 bits), C (5 bits), D (5 bits), E (6 bits), F (6 bits), G (10 bits), H (10 bits) is a m-bits integer.

Take m=64 as an example, the 64 bits integer obtained by performing the substep 2 is Tc in the embodiment 2 of the present application.

Since Tc is a 64 bits binary number and its first bit is a sign bit, therefore, the coded value in the single time scale, to which Tc belongs, can represent "year" counted by decimal number in range $[-2^{17}, 2^{17}-1]$, that is, it can represent 131072 BC~131071 AD.

For instance, take the time information to be coded "AD A B C D:E:F.GH", specifically "AD 2016.5.14 15:30:23.870124" as an example, the time information is coded according to the rules above (1)~(8) to obtain the coded values as shown in table 1.

Step 42, the computer codes the coded value Tc in a single time scale into a coded value in a specified time scale.

In the embodiment 2 of the present application, "coding level" can be used to indicate the specified time scale. As shown in the following table 2, it is a corresponding relation table between the different coding levels and corresponding time scales set for the 64 bits binary number Tc.

TABLE 2

| Coding level | Time scale |
| --- | --- |
| 1 | 65536 yr |
| 2 | 32768 yr |
| 3 | 16384 yr |
| 4 | 8192 yr |
| 3 | 4096 yr |
| 6 | 2048 yr |
| 7 | 1024 yr |
| 8 | 512 yr |
| 9 | 256 yr |
| 10 | 128 yr |
| 11 | 64 yr |
| 12 | 32 yr |
| 13 | 16 yr |
| 14 | 8 yr |
| 15 | 4 yr |
| 16 | 2 yr |
| 17 | (12 mon) 1 yr |
| 18 | 8 mon |
| 19 | 4 mon |
| 20 | 2 mon |
| 21 | (28/29/30/31 d) 1 mon |
| 22 | 16 d |
| 23 | 8 d |
| 24 | 4 d |
| 25 | 2 d |
| 26 | (24 h) 1 d |
| 27 | 16 h |
| 28 | 8 h |
| 29 | 4 h |
| 30 | 2 h |
| 31 | (60 min) 1 h |
| 32 | 32 min |
| 33 | 16 min |
| 34 | 8 min |
| 35 | 4 min |
| 36 | 2 min |
| 37 | (60 s) 1 min |
| 38 | 32 s |
| 39 | 16 s |
| 40 | 8 s |
| 41 | 4 s |
| 42 | 2 s |
| 43 | (1000 ms) 1 s |
| 44 | 512 ms |
| 45 | 256 ms |
| 46 | 128 ms |
| 47 | 64 ms |
| 48 | 32 ms |
| 49 | 16 ms |
| 50 | 8 ms |
| 51 | 4 ms |
| 52 | 2 ms |
| 53 | (1000 µs) 1 ms |
| 54 | 512 µs |
| 55 | 256 µs |
| 56 | 128 µs |
| 57 | 64 µs |
| 58 | 32 µs |
| 59 | 16 µs |
| 60 | 8 µs |
| 61 | 4 µs |
| 62 | 2 µs |
| 63 | 1 µs |

From table 2 it can be seen, there are as many time scales as possible included in the table. In particular, there are 63 time scales in total. Depending on the actual requirements, the time information to be coded can be coded into the coded value in the various time scales.

Take the time information to be coded "AD 2016.5.14 15:30:23.870124" as an example, the above time information may be coded into coded values in various time scales such as "1 year (1 yr)", "1 month (1 mon)", "1 day (1 d)", "1 hour (1 h)", "1 minute (1 min)", "1 second (1 s)", "1 millisecond (1 ms)" or "1 millisecond (1 μs)". Of course, the time information can also be coded into a coded value in other time scales.

Take the binary number Tc shown in table 1 as an example to explain in detail that how the computer codes the coded value Tc in a single time scale into a coded value in a specified time scale. Specifically, the process may include following substeps:

Substep 1: if a coder expects to code Tc into a coded value in a certain time scale, the coding level N corresponding to the time scale can be obtained by looking up the above table 2, and can be input to a computer, so that the computer can receive the coding level N input by the coder;

For example, supposing a coder expects to code Tc into a coded value in time scale "1 ms", by looking up the table 2, it is found that the coding level corresponding to "1 ms" is 53, and then the number 53 can be input to computer to enable the computer to receive the coding level N=53. Supposing the coder expects to code Tc into a coded value in time scale "1 μs", by looking up the table 2, it is found that the coding level corresponding to "1 is" is 63, and then the number 63 can be input to the computer to enable the computer to receive the coding level N=63.

It is important to note that the coding level N can be not input by the coder, but preset as the default coding level in the computer. In this case, if the coder inputs a command for instructing the computer to code Tc into a coded value in time scale N, the computer could determine that, N=default coding level.

In below, taking the coding level N (N=53 and 63) received by the computer as an example, the following substep will be explained.

Substep 2: the computer processes Tc according to operation "Tc=Tc<<1".

By performing substep 2, the 64 bits binary number shown in table 1 can be left-shifted by 1 bit.

In particular, by performing the substep 2, Tc is varied from "0000000-1111110000001010111001110111-10010111101100110000111110" recorded in the table 1 to: "000000111111000000101011100111101111001011111-10100110000-11111000". In order to distinguish the descriptions, in below, the above binary number obtained by left-shifting Tc will be referred as Tc. The purpose of left-shifting Tc by 1 bit is equivalent to calculation of Tc×2, which is the first step for coding Tc in a single time scale into a coded value in a second specified time scale.

It is important to note that, if the specified number of bits is m, an operation similar to the substep 2 can be performed for the obtained binary number Tc with m bits.

Substep 3: the computer performs a calculation according to the operation DetaT−1, wherein DetaT=1<<(63−N), on the basis of the received coding level N.

One purpose of performing substep 3 is to obtain a coded value that is closest to 0, wherein the coded values are obtained from coding the time information under a time scale corresponding to the coding level N.

Another purpose of performing substep 3 is to subsequently embody the coding level N in the coded value in specified time scale obtained by coding Tc. Please refer to the following substep 4 for the details.

Figure 5:
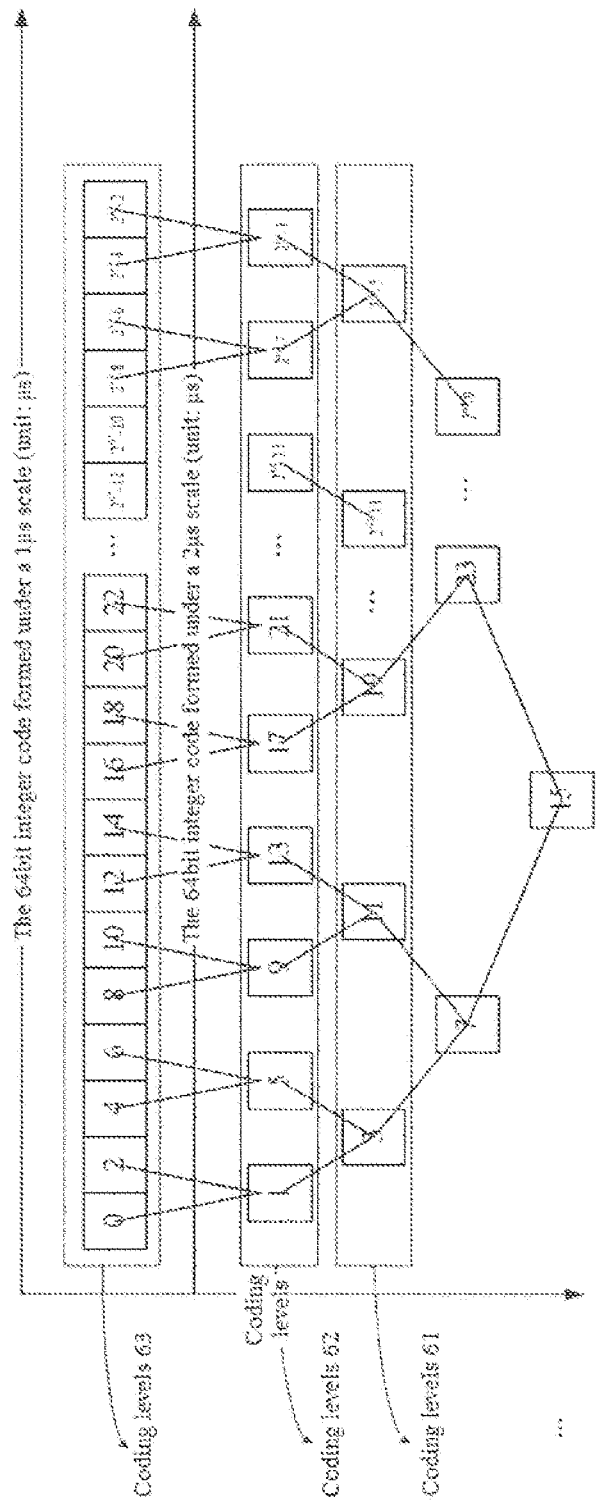
FIG. 5 illustrates a schematic diagram of the coded value in various time scales which could be obtained by coding the time information while Tc is a binary integer of 64 bits in the second embodiment.
Figure 6:
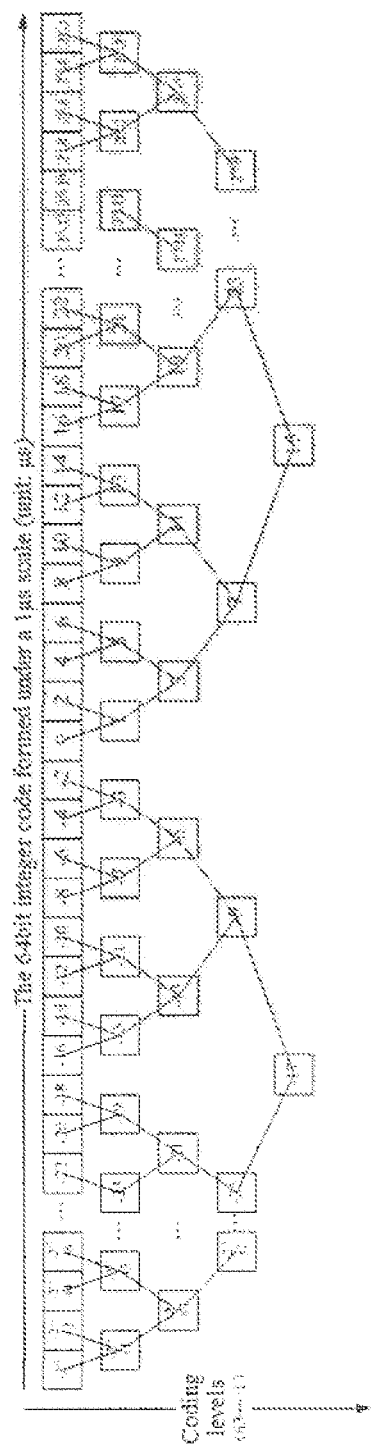
FIG. 6 illustrates a schematic diagram of the coded values in various time scales which could be obtained by coding while the time information to be coded is "AD year . . . "

As shown in FIG. 5, it illustrates a schematic diagram of the coded values in various time scales obtained by coding the time information while Tc is a 64 bits binary integer. In order to keep the high identification of the reference signs in the drawings, the coded values corresponding to the case that the sign bit of Tc is 1, i.e. the time information to be coded is "BC year . . . ", are not drawn in the FIG. 5. In particular, FIG. 6 illustrates a schematic diagram of the coded values in various time scale obtained by coding. These coded values correspond to the cases that the time information to be coded is "BC year . . . ". The following description is based on FIG. 5.

In FIG. 5, when the coding level is 63, it can be seen from table 2 that the corresponding time scale is 1 μs. Then, if Tc is encoded as the coded value corresponding to the time scale, the possible decimal coded value is shown in the first row in FIG. 5, which is one of the coded values of 0, 2, 4, 6 . . . , $2^{63}$−2. Wherein, the number of the row corresponding to the coding level 63 is an Arithmetic sequence. The span of the adjacent two numbers in the sequence is 2, which is corresponding to 1 μs of the time information.

Similarly, when the coding level is 62, the corresponding time scale is 2 μs. Then, if Tc is encoded as the coded value corresponding to that time scale, then the possible decimal coded value is shown in the second row in FIG. 5, which is one of the coded values of 1, 5, 9, 13 . . . , $2^{64}$−3. Wherein the number of this row corresponding to the coding level 62 is also an Arithmetic sequence. The span of the adjacent two numbers in the sequence is 4, corresponding to 2 μs of the time information.

The meanings of the other rows in FIG. 5 and the relationship between the numbers and the meanings of the numbers in FIG. 6 and the relationships between the numbers can be derived in the same way. Due to the limitation on the number of the figures in the specification the numbers of the 63 rows are not fully shown in FIG. 5.

Based on the above description of FIG. 5, the description is given for implementing the substep 3 to obtain "a coded value that is closest to 0, wherein the coded values are obtained from coding the time information under a time scale corresponding to the coding level N".

For example, if the computer gets N=63, according to DetaT1<<(63−N) in substep 3, DetaT=1 (binary), DetaT−1=0 can be calculated. DetaT−1=0, which corresponds to the decimal integer 0. Please refer to FIG. 5, at this point, the decimal integer 0, which is the coded value 0 that closest to 0, wherein the coded value 0 is one of the coded values obtained under the time scale of "1 μs" corresponding to the coding level N=63. Thus, the minimum coded value obtained under the time scale corresponding to the coding level of N=63 can be obtained by executing substep 3.

Similarly, taking N=53 as an example, the computer may take N=53 into DetaT=1<<(63−N) to calculate the result of DetaT=1<<(63−53), that is, DetaT=10000000000, so that DetaT−1=01111111111, corresponding to the decimal number 1023, is obtained. The decimal number 1023 is the coded value that is closet to 0 from the coded values obtained under the time scale "1 ms" corresponding to the coding level of N=53 in FIG. 5.

It should be stated that if the specified bit is m, then the computer calculates DetaT−1 according to the received coding level N in the substep 3, in which DetaT=1<<(m−1−N).

Substep 4: the computer calculates the coded value MTc of Tc under the time scale corresponding to the coding level N using "MTc=(Tc>>(64−N))<<(64−N)+DetaT−1".

In particular, taking N=53 as an example, the computer takes the calculated Tc and DetaT−1 obtained when N=53 into the calculation in substep 4, from which MTc may be obtained as follows:

000000111111000000101011100111101111001011111-0110011001111111111

The binary number is converted to the corresponding decimal number, from which the decimal number "283774738205717503" is obtained.

Taking N=63 as an example, the computer takes the calculated Tc and DetaT obtained when N=63 into the calculation in substep 4, from which MTc may be obtained as follows:

0000001111110000001010111001111011110010111110110011000011111000

The binary number is converted to the corresponding decimal number, from which the decimal number "283774738205716728" is obtained.

It is necessary to say that if the specified bit is m, then in substep 4, the computer calculates the coded value MTc of Tc under the time scale corresponding to the coding level N according to "MTc=(Tc>>(m−N))<<(m−N)+DetaT−1". The DetaT in DetaT−1 herein is calculated according to DetaT=1<<(m−1−N).

Adopting the above substep 1 to substep 4, when the values of N are different, the coded values of the time information to be coded may be obtained under the time cases corresponding to different coding levels. Taking time information "A.D. 2016-5-14 T 15:30:23.870124" to be coded for example, if a coder inputs coding level 17, 21, 26, 31, 37, 43, 53, 63 into the computer, according to the calculation of the above substep 1 to substep 4, the code values may be obtained as table 3 shown in below:

TABLE 3

| Time information | coding level | coded value(decimal) |
| --- | --- | --- |
| 2016 May 14, 15:30:23.870, 124 | 63 | 283774738205716728 |
| 2016 May 14, 15:30:23.870 | 53 | 283774738205717503 |
| 2016 May 14, 15:30:23 | 43 | 283774738204983295 |
| 2016 May 14, 15:30 | 37 | 283774738222809087 |
| 2016 May 14, 15 | 31 | 283774738424135679 |
| 2016 May 14 | 26 | 283774742719102975 |
| 2016 May | 21 | 283775155035963391 |
| 2016 | 17 | 283797145268518911 |

By performing the above steps 41 and 42, it is can be realized that the time information to be coded may be coded into coded values under different specified time scales, and whatever the specified time scale is, the coded values are binary integers with the same bits (which could be converted into decimal integers with the same bits), to facilitate storing and managing the coded values according to the unified storage structure. Compared with the existing technology that the time information is coded as a string, the obtained coded values are integers using the technical schemes provided by embodiments of the present application to facilitate subsequent relevant calculation efficiently.

In the prior art, currently, a time information coding scheme generally corresponds to only one time scale. This situation is especially obvious in database systems. For example, if the data type of a field is set as Date, it means that one the time scale of "one day" may be stored under such time information coding scheme. If such Date data type is adopted, the time scale of one year "the battle of red cliff" event can only be stored into the wrong time "208-01-01". The "$4^{th}$ May movement" event, which has a time scale of one day, can be accurately stored as "1919-05-04". In general, in the conventional time information coding scheme, multi-scale time information is compulsorily converted to a single-scale time information with loss for storage, which has poor flexibility, and is difficult to meet different coding requirement. The single scale time information herein refers to the coding time information in a single time scale (such as one day) such that the coded value is obtained under the single time scale.

However, the time information coding scheme adopted by the embodiments of the present application involves coding the time information to be coded into a first integer with specified bits under the first time scale, coding the first integer into a second integer with the specified number bits under the second time scale, and the second integer is considered as the coded value of the time information to be coded in the second time sale. Because of the information of the second time scale could be specified by a user, and the second time scale could be multiple. For example, there could be 63 time scales as shown in table 2. Therefore, the present scheme may support the colder to flexibly specify the time information of the different second time scale according to the actual coding requirement such that multiple coded values may be obtained under different time scale. It is appreciated that under the situation of the time information to be coded being as multiple time scales, multiple coded values with different second time scales may be obtained by adopting the present scheme, which has higher flexibility and may meet different coding requirement.

The time information coding methods provided by the embodiments of the present application could be used in file system and database for processing the time information of the file system or database to be inputted, or for the file system or database processing the time information of the file system or database. For example, by way of using the method provided by the embodiment of the present application the time information to be input into the file system may be coded as a corresponding coding value, which is then then input into the file system (or database) for storing. Alternatively, the file system (or the database system) could adopt the method to code the time information of the file system (or data base system) to obtain and save the corresponding coded value.

The description about how to save, index and process the obtained coded values of different time scales is given in details as follows.

First, how to store the coded values under different time scales is explained.

In the embodiments of the present application, the computer may output the coded value by performing step 42 to the data receiving part (for example, the database) for storage. For the storing way which the database adopts, the data storing structure corresponding to one dimensional index such as B tree or B+ tree, etc., may be adopted to store the coded value for the subsequent searching. Since the storage of data using B tree is already a relatively mature technology, in the detailed description of the embodiments of the present application for this would not be given.

The following description is given for explaining, how the computer performs calculation based on the stored coded value. Specifically, the calculation includes:

First type operation: for specified coded value MTc, determining the coding level N corresponding to MTc.

Second type operation: for specified coded value MTc, when determining the coding level of MTc is N, determining the coded values of MTc under other time scales, that is, determining the coded value NT of the time information corresponding to MTc under the time scales corresponding to the coding level that is greater than N (recorded as Nz).

Wherein, assuming there are X coding levels, the value range of Nz is [N+1, X]. Besides, it is need to state, MTc and the coded values included in the other time scales of MTc are the coded values which are obtained by coding the same time information.

For the "inclusion", it is necessary to explain that when inclusion relationship exists among the coded values corresponding to different coding levels shown in Table 2, inclusion relationship also exists among the corresponding time information. Taking the time information "2016-5-14 T 15:30" in table 3 for example, the time information includes all the time information under different time scales from "2016-5-14 T15:30:0. 00" to "2016-5-14 T 15:30: 0.999999"; accordingly, the inclusion relationship exists between the coded value of the time information of "2016-5-14 T 15:30" under the time scale corresponding to the $37^{th}$ coding level, and the coded values under the time scales corresponding to the $38^{th}$ to $63^{rd}$ coding level. To be specific, this indicates that the coded value under the time scale corresponding to the $37^{th}$ coding level of the time information includes the coded values under the time scales correspond to the $38^{th}$ to $63^{rd}$ coding level.

The third type operation: for the specified coded value MTc, under the situation that the coding level corresponding to MTc is confirmed to N, in case of coding level N, determine the coded values under the other time scales of MTc, for which determining the coded value FT under the time scales corresponding to the coding level.

Wherein, it is need to state, MTc and the coded values under the other time scales included by MTc are the coded values obtained by coding the same time information.

The fourth type operation: decoding operation. In particular, for the specified coded value MTc, under the situation that the coding level corresponding to MTc is determined as N, MTc is converted into the coded value TC under single time scale.

The fifth type operation: for the specified coded value MTc1 and MTc2, determining the time relationship between MTc1 and MTc2 to determine if MTc1 and MTc2 are overlapped, connected, or separate.

Here is some description about the operation of these five types.

I. Implementation of the first type operation: "for the specified coded value MTc, determining the coding level N corresponding to MTc":

Assuming when coding Tc, Tc is coded as a coded value MTc under one time scale out of the 63 time scales in table 2, then, taking the obtained MTc through this way for instance, the implementation of the first type operation comprises the following steps:

Step 1: the computer determines the specified coded value MTc.

Here the specified coded value MTc is the coded value corresponding to the coding level N to be determined.

For example, after the computer receives the determining command of coding level which the user inputs, the computer enters the state of monitoring the coded value. In this state, if the computer receives the coded value MTc which the user inputs, the computer determines MTc which the user inputs is the specified coded value MTc.

Or according to the selected command which the user inputs for MTc, the computer determines the coded value MTc corresponding to the selected command as the specified coded value MTc.

Step 2: the computer determines if the coded value MTc is odd or even (which is to determine if MTc&1=0), if it is even (which is MTc&1=0), performing step 3; if it is odd (which is Tc&1≠0), then performing step 4;

Step 3: the computer determines that the coding level corresponding to MTc is N=63, which means that MTc is the coded value of the time scale "1 μs" corresponding to the 63rd level, and the process ends.

It should be noted that if the specified bit is m, then in step 3, the computer determines that the coding level corresponding to MTc is N=m−1, and the process ends.

Step 4: the computer calculates the integer Mid=(MTc−1)^(MTc+1);

Wherein, the symbol "^" represents XOR operation.

The purpose to calculate Mid is to determine the how many bits of the high position of MTc−1 and MTc+1 are the same, to find the same parent time duration closest to MTc−1 and MTc+1, which are two multiple scale integer coding.

Wherein, the parent time duration coded value of MTc−1 and MTc+1, is the coded value which has the inclusion relationship with MTc−1 and MTc+1 mentioned above. In particular, the parent time duration coded value includes MTc−1 and MTc+1.

Step 4: after completing the operation, to perform step 5.

Step 5: the computer uses dichotomy to determine how many bits on the left side of the whole Mid (64 bits) are 0, and the coding level corresponding to MTc is determined according to the determination result.

In particular, the bits of Mid is m, and m here is the integer power of 2. For example, when m is equal to 64, m=64=$2^6$. If the power of 2 is recorded as n (for example, m=64, n=6), for Mid, under the situation that initializing n=0, and value of the variable i being the range of [1, n], performing the following cycle operation until the values variable i ranges from n decreasing to 1, and under the situation that i=1 calculating the corresponding values of n, and then the cycle terminates. Specifically, the cycle operation includes:

obtaining the high position of Mid through the mask $\Sigma_{k=0}^{2^{i-1}-1} 2^{2^{i-1}-k}-1$, value of variable i ranges from n to 1, then shifting the obtained high position symbol of right shift being as >>) by $2^{i-1}$ bits to obtain Mid0, and determining whether the Mid0 is 0 at this time or not. If Mid0 is not 0 at this time, Mid=Mid0, and N stays the same; if the Mid0 is 0, then calculating Mid=Mid& ($\Sigma_{k=0}^{2^{i-1}-1} 2^{2^{i-1}-k}$), N N+$2^{i-1}$ through the mask.

Specifically, when MTc is a binary integer (m=64) of 64 bits, under the situation that initializing N=0 and value of variable i being the range of [1, N), the cyclic operation can include the following substep 51~substep 56. When the following substeps are performed, the substep 52 is executed following the completion of substep 51; after the execution of substep 52, then the substep 53, and so on to perform the above implementation order:

Substep 51: for Mid, obtaining the high position of Mid through mask 0xFFFFFFFF00000000, and then shifting the obtained high position by 32 bits (symbol of right shift being as >>) to obtain Mid0, determining if Mid0 at this time is 0. If mid0 is not 0, Mid=Mid0, and N stays the same, and then performing substep 52; otherwise calculating Mid=Mid& 0x00000000FFFFFFFF, N=32, and then performing substep 52

Substep 52: for Mid, obtaining high position through mask 0xFFFF0000, and then shifting the obtained high position (symbol of right shift being as >>) by 16 bits to obtain Mid0, determining if Mid0 at this time is 0. If mid0 is not 0, Mid=Mid0, and N stays the same, and then performing substep 53; otherwise calculating Mid=Mid& 0x0000FFFF, N=N+16, and then performing substep 53.

Substep 53: for Mid, obtaining high position through mask 0xFF00, and then shifting the obtained high position bits (symbol of right shift being as >>) by 8 bits to obtain Mid0, determining if Mid0 at this time is 0. If mid0 is not 0, Mid=Mid0, and N stays the same, and then performing substep 54; otherwise calculating Mid=Mid& 0x00FF, N=N+8, and then performing substep 54;

Substep 54: for Mid, obtaining high position through mask 0xF0, and then shifting the obtained high position bits (symbol of right shift being as >>) by 4 bits to obtain Mid0, determining if Mid0 at this time is 0. If mid0 is not 0, Mid=Mid0, and N stays the same, and then performing substep 55; otherwise calculating Mid=Mid& 0x0F, N=N+4 and then performing substep 55;

Substep 55: for Mid, obtaining high position through mask 0xC, and then shifting the obtained high position bits (symbol of right shift being as >>) by 2 bits to get Mid0, determining if Mid0 at this time is 0. If mid0 is not 0, Mid=Mid0, and N stays the same, and then performing substep 56; otherwise calculating Mid=Mid& 0x3, N=N+2 and then performing substep 56.

Substep 56: for Mid, obtaining high position through mask 0x2, and then shifting the obtained high position bits (symbol of right shift being as >>) by 1 bits to get Mid0, determining if Mid0 at this time is 0. If mid0 is not 0, Mid=Mid0, and N stays the same, and the procedure ends; otherwise calculating Mid=Mid& 0x1, N=N+1 and then the procedure ends.

The following examples illustrate the particular implementation of the first type of operations.

For example, assuming that m=64, the specified coded value $MTc=(283774738222809087)_{10}$, then the following steps can be used to determine the coding level corresponding to the specified coded value:

Step 1: computer determines if $MTc=(283774738222809087)_{10}$ is non-0, even or odd;

Because the computer calculates to obtain MTc&1=1, and determines MTc is odd, performing the following step 2.

Step 2: calculating Mid;

In particular, Mid=(MTc−1)^(MTc+1)=134217726 can be calculated.

Under the binary, $Mid=(11111111111111111111111111110)_2$

Step 3: determining how many bits are 0 among the left bits of the binary integer Mid (64 bit), and according to the determining result, determining the coding level N corresponding to MTc. The specific calculation process, in turn, includes the following substeps ②~step ⑥.

Substep ①: for Mid, through the mask 0xFFFFFFFF00000000 obtaining the high position of Mid, and then shifting the high position to right symbol of right shift being as >>) by 32 bits to obtain $Mid0=((11111111111111111110)_2\&0xFFFFFFFF0000000)>>32$, and then determining Mid0=0, so calculating Mid=Mid& 0x00000000FFFFFFFF=$(11111111111-11111111111110)_2$, N=32, and then performing substep ②;

Substep ②: for Mid=Mid& 0x00000000FFFFFFFF= $(11111111111111111111111111110)_2$, through the mask 0xFFFF0000 to obtain the high position, and then shifting the obtained high position to right (symbol of right shift being as >>) by 16 bits to obtain $Mid0=((11111111111111111111111110)_2\&0xFFFF0000)>>16= (1111111111)_2$; because Mid0 is not 0, Mid=Mid0, N stays the same, which is N=32, and then performing substep ③;

Substep ③: for the $Mid=((11111111111111111111111110) 2 \& 0xfff0000)>>16=2 (1111111111)$, obtaining the high position through the mask 0xff00, then shift the obtained high position to the right (symbol of right shift being as >>) by 8 bits to get Mid0=$((1111111111) 2 \& 0xff00)>>2$ (111); because Mid0 is not 0, Mid=Mid0, N stays the same, that is, N=32, and then performing the substep ④;

Substep ④: for $Mid=((11111111111)_2\&0xFF00)>>8= (111)_2$ at this time, obtaining the high position bits through the mask 0xC, then shifting the obtained high position to right (symbol of right shift being as >>) by 4 bits to obtain $Mid0=((111)_2\&0xF0)>>4=0$; since Mid0 is not 0 at this time, calculating Mid=Mid& $0x0F=(111)_2$, N=32+4=36;

Substep ⑤: for $Mid=(111)_2$ at this time, obtaining the high position bits through the mask 0xC, then shifting the obtained high position to right (symbol of right shift being as >>) by 2 bits to obtain $Mid0=((111)_2\&0xC)>>2=1$; since Mid0 is not 0 at this time, Mid=Mid0, N=36;

Substep ⑥: for Mid=1 at this time, obtaining the high position through the mask 0x2, then shifting the obtained high position to right (symbol of right shift being as >>) by 1 bit to obtain Mid0=(1 &0x2)>>1=0; since Mid0 is 0 at this time, calculating Mid=Mid & 0x1=1, N=36+1=37.

Through the above operation, at last N=37 is obtained.

II, the implementation of the second type operation "for the coded value MTc, after determining the coding level corresponding to MTc is N, determining the coded values under other time scales included by MTc":

In the second type of operation, how to determine the coding level N corresponding to MTc may refer to the implementation of the first type of operation described above. The following part focuses on how to determine the coded values under other time scales included by MTc.

As the above description of the "inclusion relation", by way of adopting the time information coding method of the embodiments of the present application, the inclusion relationship usually exists among the obtained coded values under the different time scales. The purpose of the second type operation is to obtain the coded values under the other time scales included by the specified coded value MTc from the coded values (including MTc, and other coded values) under different time scales by coding the same time information. The coded values under the other time scales included by MTc may be referred as the child time duration coded value of MTc, and recorded as NT in the embodiments of the present application.

In the embodiments of the present application, when MTc is a 64 bits binary coded value, assuming the coded value under the other time scales included by the specified coded value MTc is recorded as NT, because of adopting the time information coding method of the embodiments of the present application, for the coded values under different time scales by coding the same time information, there is characteristic that "the coding level corresponding to the time scale is negatively related with the coded value under the time scale", that is "the greater the coding level corresponding to the time scale, the smaller the coded value under the time scale". So, NT meets:

$$A \leq NT \leq B, \text{ wherein, } A=MTc-1<<(63-N)+1, B=MTc+1<<(63-N)-1$$

Wherein, for the other time scales mentioned here, shown from table 2, if the coding level corresponding to MTc is N (for example 37), the other time scales means that the time scales corresponding to the other coding levels greater than N in table 2.

It is needed to state, if the specified bit is m, then: A=MTc−1<<(m−N−1)+1, B=MTc+1<<(m−N−1)−1.

In particular, taking m=64, MTc=10 (283774738222809087), the coding level N=37 corresponding to MTc for example, according to the calculation that A=MTc−1<<(63−N)+1, B=MTc+1<<(63−N)−1, the other coded values NT included by MTc may be calculated as following:

$$(283774738155700224)_{10} \leq NT \leq (283774738289917950)_{10}$$

Combined with table 3, the code value range [A, B] obtained according to the calculation contains at least the coded values corresponding to coding levels 63, 53, 43 respectively as shown in table 3 such that the coded value included by MTc corresponding to the coding level 37 may be determined accurately.

In the embodiments of the present application, after the computer determines the value range of the coded values which are included in MTc, the range is considered as the searching base, and is output to the database which saves the coded values, to trigger the server of the database to search for the coded values in the range from the saved coded values. Of course, the computer can be the server of the database, and after the server determines the range of all the other coded value NT included in MTc, the computer may search for the coded values in the range from the saved coded values based on the range.

III. here is the description of the implementation of the third type operation: "for the specified coded value MTc, after determining the coding level corresponding to MTc is N, determining the coded values under the other time scales included in MTc, which is to determine coded values FT under the time scale corresponding the coding level which is smaller than N".

In the third type operation, how to determine the coding level N corresponding to MTc may refer to the above description about implementation of the first type operation, and the description is not introduced here. And the following part highlights how to determine the value of the coded value FT, which are included in MTc's other time scales.

As the above description about "inclusion relationship", by way of adopting the time information coding method of the embodiments of the present application, the inclusion relationship usually exists among the obtained the coded values under the different time scales. The purpose of the third type calculation is to obtain the coded values under the other time scales included by the specified coded value MTc from the coded values (including MTc, and other coded values) under different time scales by coding the same time information. The coded values under the other time scales included in MTc, may be referred as the parent time duration coded value of MTc, and recorded as FT in the embodiments of the present application.

In the embodiments of the present application, when MTc is a 64 bits binary coded value, because of adopting the time information coding method of the embodiments of the present application, for the coded values under different time scales by coding the same time information, there is characteristic that "the coding level corresponding to the time scale is negatively related with the coded value under the time scale", that is "the greater the coding level corresponding to the time scale, the smaller the coded value under the time scale". So, the coded value NT under the other time scale included in MTc meets:

$$FT=(MTc>>(64-N+N'))<<(64-N+N')+OTn-1$$

Wherein, the calculation method of OTn is: OTn=1<<(63−N+N'), and N' is in the range of value [1, N−1]. The physical meaning of OTn refers to the coded value that is closes to 0 from the coded values under the time scales corresponding to the coding level N−N'. The relationship between coded value under the time scale corresponding to the coding level and 0 may refer to FIGS. 5 and 6.

It is necessary to note that if the specified bit is m, the coded value FT under the other time scale included by MTc shall satisfy:

$$FT=(MTc>>(m-N+N'))<(m-N+N')+OTn-1$$

Wherein, the calculation of OTn is: OTn=1<<(63−N+N'), and the value of OTn=1<(m−N+N'−1), and the value of N' is [1, n−1].

For example, taking m=64, MTc=$(283774738222809087)_{10}$ and the coding level N=37 corresponding to MTc for example, here is the description about how the third type operation determines the parent time duration coded value FT included by MTc.

Taking "16" out of the range of N' [1,37−1] for example, first, for the coded values under the time scale corresponding to the coding value N−N'=21, the coded value OTn which is the closest to 0 may be calculated:

$$OTn=1<<(63-21)=(4398046511104)_{10}$$

Then, based on the calculated OTn, calculating the parent time duration coding under the time scale corresponding to the 21th coding level of MTc:

$$FT=(MTc>>(64-21))<<(64-21)+OTn-1=(283775155035963391)_{10}$$

Similarly, when the value range of N' is other value within range of [1, 37−1], and the parent time duration coding may be calculated by referring to the above similar calculation, and the explanation is not described here in detail.

In the embodiments of the present application, the computer which implements the third type operation could be the server of the database. And then, after the server determines the coded value under the other time scales included in MTc by way of the third type operation, it could may adopt the coded value under the other time scales as the searching result of the coded value under other time scales included in MTc to feedback to the searching entity which sends the "searching request of coded value under the other time scales included in MTc".

IV. here is the description about the implementation of the fourth type operation "for the specified coded value MTc, under the situation that the coding level N corresponding to MTc is determined as N, MTc is converted into the coded value Tc under the single time scale", which is also the implementation to decode the MTc.

In the fourth type operation, the description of how to determine the coding level N corresponding to MTc for the specified coded value MTc may refer to the above introduction about the implementation of the first type operation, and the details are not described here. Here the description focuses on how to convert MTc to the coded value TC under the single time scale.

In particular, MTc may be converted to the coded value Tc under single time scale according to the following calculation:

$$Tc=(MTc-1<<(63-N)+1)>>1$$

By the above calculation, after the converting MTc to the coded value Tc under the single time scale, the further decoding could be performed for Tc. Assuming Tc is a 64 bits integer, and the specified decoding procedure is as following:

Base on the introduction of rules (1)~(8), the decoding could comprise: based on A (18 bits), B (4 bits), C (5 bits), D (5 bits), E (6 bits), F (6 bits), G (10 bits), H (10 bits) bit field width, to directly obtain the corresponding binary number of the respective bit from Tc in binary in turn, and the obtained binary numbers of the respective bit are converted into the bits in decimal such that the conventional representation of time information corresponding to MTc is obtained. AD A-B-C T D:E:F.GH.

For example, taking MTc=$(283775155035963391)_{10}$, coding level of MTc is N=21 for instance, based on the operation of Tc=(MTc–1<<(63–N)+1)>>1, the following could be obtained:

$$Tc = (MTc - 1 << (63\text{-}21) + 1) >> 1$$

$$= (141885378494726144)_{10}$$

$$= (111111000000101000000000000000000000000000000000)_2$$

Further, based on the bit field width of A (18 bits), B (4 bits), C (5 bits), D (5 bits), E (6 bits), F (6 bits), G (10 bits), H (10 bits), the corresponding binary number of the respective bit is obtained from Tc in binary in turn. The obtained binary number of the respective bit and the corresponding number in decimal are as following:

A=$(000000011111100000)_2$=$(2016)_{10}$; B=$(0101)_2$=$(5)_{10}$; C=0; D=0; E=0; F=0; G=0; H=0.

And then, according to the number in decimal, the conventional representation of the time information corresponding to MTc could be obtained as: AD 2016-5. Until now, the decoding of MTc is completed. And the purpose of decoding MTc as the time information is achieved.

It is need to state, if the specified number is m, then Tc=(MTc–1<<(m–N–1)+1)>>1. And the m bit integer corresponding to Tc may be obtained directly based on the but field width A ((m–46) bits), B (4 bits), C (5 bits), D (5 bits), E (6 bits), F (6 bits), G (10 bits), H (10 bits), the conventional representation of time corresponding to MTc could be formed as: AD A-B-C T D:E:F.GH.

V. at last, the implementation of the fifth type operation "for the specified coded values MTc1 and MTc2, determining the time relationship between MTc1 and MTc2, and determining if the relationship is overlapped, connected, or separate" is introduced.

First, the relationship of "overlapping", "connection" and "separation" between two coded values is described.

Overlapping of the two coded value means that the two coded values respective include the ranges which the two coded values under other time scales belong to (as the mentioned rage [A, B]). It is needed to state that if one coded value range includes another coded value range, it means that there is overlap between the two coded values.

Connection between the two coded values means that the coded value ranges which the two coded values under other time scales belong to respectively meet: the upper limit of one coded value range equals to the lower limit of another coded value range minus 2.

Separation between two coded values means that there is no overlap between the coded value ranges which the two coded values under other time scales belong to respectively.

Here is further explanation about how to implement the fifth type operation:

First, the second type operation is adopted to determine the coded values under other time scales which MTc1 and MTc2 include respectively.

For example, assuming the second type operation is adopted, it is determined that the coded value under the other time scales which MTc1 includes is the coded value belongs to the coded value range of [A1, B1], and the coded value under the other time scales which MTc2 includes is the coded value belongs to the coded value range of [A2, B2].

And then, based on the relationship between A1, B1, A2, B2, whether MTc1 and MTc2 are overlapped, connected or separate or not is determined. In particular:

If B1<A2, the result is: MTc1 and MTc2 are separate, and MTc1 is before MTc2 (i.e., MTc1 is smaller than MTc2, and the similar expression in the following is the same as this, and it is not repeated herein);

If B2<A1, the result is: MTc1 and MTc2 are separate, and MTc2 is before MTc1 (that is, MTc2 is smaller than MTc1);

If A<A2 and B2<B1, then the result is: MTc1 contains MTc2;

If A2<A1 and B1<B2, then the result is: MTc2 contains MTc1;

If A1<A2 and A2<B1 and B1<B2, then the result is: MTc1 and MTc2 is overlapping and MTc1 is before MTc2;

If A2<A1 and A1<B2 and B2<B1, then the result is: MTc1 and MTc2 in overlapping and MTc2 is before MTc1;

If A1=B2–2, then the result is: MTc1 and MTc2 is connected, and MTc2 is before MTc1;

If A2=B1–2, then the result is: MTc1 and MTc2 is connected, and MTc1 is before MTc2.

If A2=b1–2, the result is: MTc1 and MTc2 is connected, and MTc1 is before MTc2.

For example, if two coded values are MTc1=$(283775155035963391)_1$, MTc2=$(283774738222809087)_{10}$ respectively, then the implementation of the third type operation includes:

First, through the second type operation, the coded value range which the coded value under other time scales included by MTc1 belongs to is [$(283770756989452288)_{10}$, $(283779553082474494)_{10}$] is obtained, and the coded value range which the coded value under other time scales included by MTc2 belong to is [$(283774738155700224)_{10}$, $(283774738289917950)_{10}$].

And then, the relationship between the two coded value ranges are calculated and determined. Due to the two coded value ranges meet:

$(283770756989452288)_{10}$<$(283774738155700224)_{10}$, and $(283774738289917950)_{10}$<$(283779553082474494)_{10}$ So, the determining result could be obtained, in which MTc1 contains MTc2.

Embodiment 3

Figure 7A:
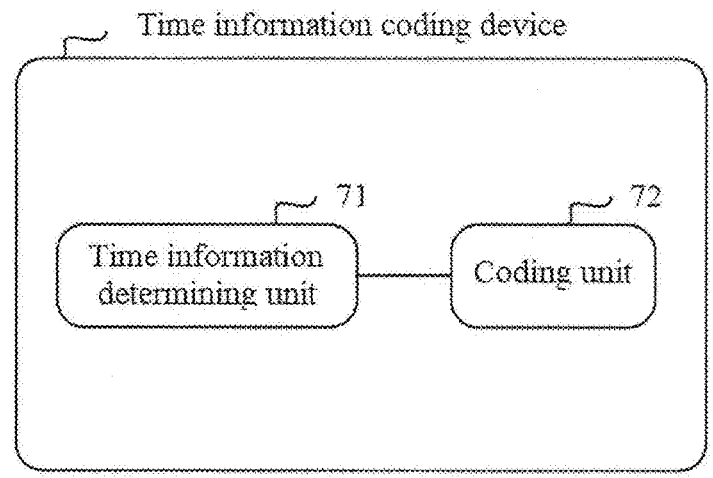
FIG. 7a illustrates a schematic architecture diagram of a time information coding device according to one embodiment of the application.

In order to solve the low calculation efficiency of coded value due to the adoption of the existing time information coding schemes, the embodiment of the present application provides a time information coding device. The specific structure of the device is illustrated in FIG. 7a, comprising the following function elements:

a time information determining unit 71, for determining a time information to be coded.

Figure 7B:
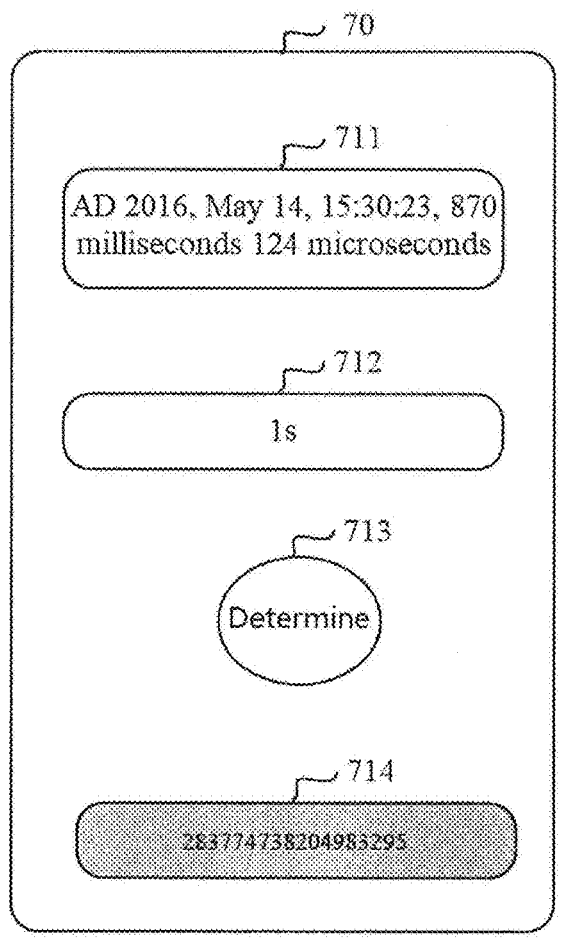
FIG. 7b illustrates a schematic diagram of a user interface displayed by the time information coding device according to one embodiment of the application.

For example, the time information coding device may display the user interface 70 shown as 7*b*, and then, the time information determining unit 71 may determines the time information input to the time information input box 711 of the user interface by the user as shown in FIG. 7*b* as to be determined.

a coding unit 72, for coding the time information to be coded to a first integer with a specified number of bits under a first time scale; and coding the first integer to a second integer with the specified number of bits under a second time scale according to the information of the second time scale, the second integer being as a coded value under the second time scale of the time information to be coded.

Still taking the user interface in FIG. 7*b* as example, coding unit 72 may determine the information of the time scale, for example "1s" in the FIG. 1, input by the user to the time scale input box 712 of the user interface as the information for the second time scale. After the user clicks the ACK button 713 in FIG. 7*b*, the coding unit 72 could perform the following operation: coding the time information to be encoded to a first integer with a specified number of bits under a first time scale; and according to a second time scale coding the first integer into a second integer with a specified number under the second time scale.

In one embodiment, the details may refer to the description of Embodiment 1 about how the time information determining unit 71 codes the time information to be coded into the first integer with the specified number of bits under the first time scale. The details are not described herein again.

In the embodiment of the present application, the description about how the coding unit 72 codes the first integer into the second integer with the specified number of bits according to the second time scale information may refer to the implementation of coding the first integer to the second integer in embodiment 1 and embodiment 2. The details are not described herein again.

In the embodiment of the present application, to facilitate using the second integer, or using the second integer for some calculation, the device shown in FIG. 7 further comprises a storage unit. The storage unit is used to store the second integer locally, or send the second integer to the data storer to save the data in the data storer.

In the embodiment of the present application, the device may further comprise a displaying unit, and the displaying unit is used to display the second integer. For example, taking the user interface in FIG. 7*b* for example, the displaying unit displays the second integer in the result displaying box 714 of the user interface.

Figure 8:
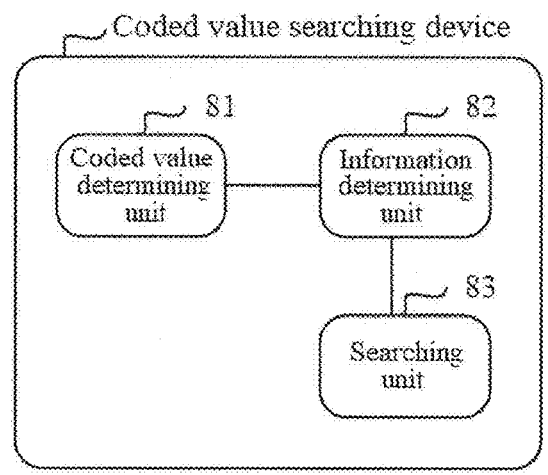
FIG. 8 illustrates a schematic architecture diagram of a coded value searching device according to one embodiment of the application.

Based on the same technical schemes same as the coded value searching method the embodiments of the present application, the embodiment of the present application further provides a coded value searching device. The specified structure of the device may be shown in FIG. 8 and comprises the following function units:

a coded value determining unit 81 determining a coded value with a specified number of bits.

an information determining unit 82 determining information of a time scale corresponding to the coded value of the specified number of bits.

a searching unit 83 searching for a target coded value in association with the coded value with the specified number according to the information of the time scale information corresponding to the coded value of the specified number of bits.

Wherein, the target coded value and the coded value with the specified number of the bits are obtained by coding the same time information through the time information coding method.

Figure 9:
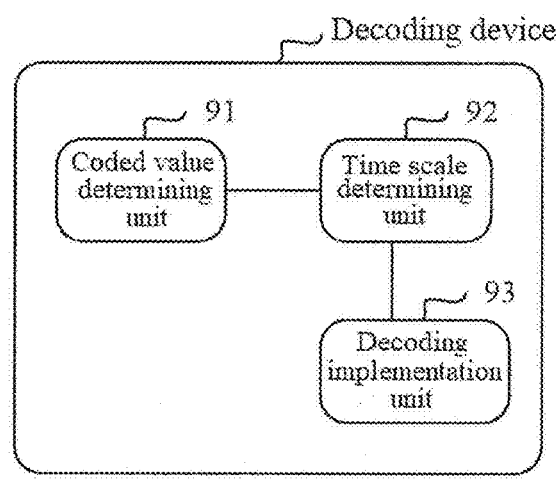
FIG. 9 illustrates a schematic architecture diagram of a decoding device according to one embodiment of the application.

Based on the same technical schemes same as the coded value searching method the embodiments of the present application, the embodiment of the present application further provides a decoding device. The specified structure of the device may be shown in FIG. 9, and comprises the following function units:

a coded value determining unit 91 determining the coded value with the specified number of bits to be decoded;

a time scale determining unit 92 determining the information of the time scale corresponding to the coded value to be decoded;

a decoding implementation unit 93, decoding the coded value to be decoded into corresponding time information according to the information of the time scale corresponding to the coded value to be decoded, and the specified number of bits.

the present application is described according to the method, equipment (system), and the flow chart and/or the block diagram of the computer program product. It should be understood that each flow and/or block in the flow chart and/or block diagram, and the combination of the flow and/or block in the flow charts and/or block diagrams may be implemented by computer program instructions. The computer program instructions can be provided to a general computer, a dedicated computer, an embedded processor or a processor of other programmable data processing device to produce a machine, such that the instructions executed by the computer or the processor of the other programmable data processing device may generate a device for implementing the function specified in one or multiple flows of the flow chart and/or one or multiple blocks of the block diagram.

These program instructions can also be stored in the computer readable memory that may make the computer or other programmable data processing equipment to work in a particular way such that the instructions stored in the computer readable memory may generate a product including an instruction device. The instruction device may implement the function specified in one or multiple flows of the flow chart and/or one or multiple blocks of the block diagram.

The computer program instructions can be loaded into a computer or other programmable data processing equipments to make the computer and the other programmable data processing equipment perform a series of steps to produce the processing of computer implementation such that the instructions executed on the computer or the programmable data processing equipments may provide the steps for implementing the function specified in one or multiple flows of the flow chart and/or one or multiple blocks of the block diagram.

In a typical configuration, the computing device includes one or more processors (CPU), input/output interfaces, network interfaces, and memory.

The above description merely illustrates the embodiment of the present application and is not used to limit the application. For the person skilled in the art, the present application may have various kinds of changes and variation. Any modification, equivalent replacement or improvement made under the spirit and principle of the present application shall be included within the scope of the claims of the present application.

What is claimed is:

1. A method for processing time information to be coded, the method comprising:
obtaining, via at least one of a file system, a database, or an input at a user interface, the time information;
encoding, via a calculation device, the time information into a first integer represented by a specified number of bits under a first time scale;
encoding, via the calculation device, the first integer into a second integer represented by the same number of bits under a second time scale, wherein the second time scale is (i) different from the first time scale and (ii) indicated by a parameter that corresponds to the second time scale, the second integer being as a coded value under the second time scale for the time information, wherein the encoding of the first integer into the second integer comprises:
shifting, via the calculation device, the first integer to the left by one bit, to obtain the shifted first integer T'c;
calculating, via the calculation device, DetaT according to DetaT=1<<(m−1−N), wherein N is the information for the second time; and
calculating, via the calculation device, MTc as the second integer according to MTc=(T'c>>(m−N))<<(m−N)+DetaT−1, wherein m is the specified number of bits; and
storing, via the file system or database, the second integer; and
after the storage, performing a search.

2. The method in claim 1, wherein the first time scale is a minimum time scale among a plurality of time scales determined according to a maximum number of binary bits that the calculation device is able to process in one calculation.

3. The method in claim 1, wherein the parameter comprises at least one of the following:
default time scale information; or
information of the second time scale input at the user interface.

4. The method in claim 1, wherein the encoding of the time information into the first integer is performed according to a predetermined coding rule; and
wherein the predetermined coding rule comprises: making coded values corresponding to different time segments included in the time information commonly occupy 46 bits, the different time segments comprising a month, date, hour, minute, second, millisecond, and microsecond.

5. The method in claim 4, wherein the predetermined coding rule further comprises:
coding the time information which comprises the segment of month to a 4-bit binary number;
coding the time information which comprises the segment of date to a 5-bit binary number;
coding the time information which comprises the segment of hour to a 5-bit binary number;
coding the time information which comprises the segment of minute to a 6-bit binary number;
coding the time information which comprises the segment of second to a 6-bit binary number;
coding the time information which comprises the segment of millisecond to a 10-bit binary number;
coding the time information which comprises the segment of microsecond to a 10-bit binary number.

6. The method in claim 5, wherein the predetermined coding rule further comprises:
coding the time information which comprises the segment of year to a (m−46)-bit binary number, wherein m is the specified number of bits; a first bit of the (m−46) binary number is the signed bit; when the time information to be coded represents the time BC, the number in the signed bit is 1, representing a minus value;
when the number in the signed bit is 1, every information of the time segment included in the time information to be coded is coded by a complement representation.

7. The method in claim 1, wherein the file system or database is local to the calculation device; or
wherein the second integer is remotely sent to the file system or database.

8. The method of claim 1, wherein the encoding of the first integer into the second integer comprises:
according to specified information of a plurality of second time scales, coding the first integer to the second integer with the specified number of bits under each of the plurality of the second time scales.

9. A coded value searching method, comprising:
determining a coded value with a specified number of bits;
determining information of a time scale corresponding to the coded value of the specified number of bits;
searching a target coded value in association with the coded value with the specified number of bits according to the information of the time scale corresponding to the coded value with the specified number of bits;
wherein, the target coded value and the coded value with specified number of bits are obtained by coding the same time information through the coding method for time information of claim 1,
wherein searching a target coded value in association with the coded value with the specified number of bits according to the information of the time scale corresponding to the coded value with the specified number of bits comprises:
according to the information of the time scale corresponding to the coded value with the specified number of bits, searching the coded value with the time scale smaller than the time scale of the coded value with the specified number of bits; or
according to the information of the time scale corresponding to the coded value with the specified number of bits, searching the coded value with the time scale greater than the time scale of the coded value with the specified number of bits.

10. The method of claim 9, wherein according to the information of the time scale corresponding to the coded value with the specified number of bits, searching the coded value with the time scale smaller than the time scale of the coded value with the specified number of bits comprises:
according to the information of the time scale corresponding to the coded value with the specified number of bits, calculating a coded value range [A, B] based on A=MTc−1<<(m−1−N)+1, B=MTc+1<<(m−1−N)−1, a; wherein, MTc is the coded value with the specified number of bits; M is the specified number of bits; N is the information of the time scale corresponding to MTc;
searching the coded value within [A, B] as the searching result according to the range of the coded value [A, B].

11. The method of claim 9, wherein according to the information of the time scale corresponding to the coded value with the specified number of bits, searching the coded value with the time scale greater than the time scale of the coded value with the specified number of bits, comprises:

calculating the OTn respectively corresponding to different values N' based on OTn=1<<(m−1−N+N'), wherein, MTc is the coded value with the specified number of bits; M is the specified number of bits; N is the information of the time scale corresponding to MTc; Values of N' include at least one integer in [1, N−1];

according to each of the calculated OTn, calculating every FT corresponding to every OTn as the searching result according to FT=(MTc>>(m−N+N'))<<(m−N+N')+OTn−1.

12. The method of claim 9, wherein determining information of the time scale corresponding to the coded value with the specified number of bits, comprises:

determine the parity of the coded values with specified number of bits;

when determining the coded value with the specified number of bits is odd, calculating Mid according to Mid=(MTc−1)^(MTc+1), wherein, MTc is the coded value with the specified number of bits;

for Mid, under the situation that initializing N=0, and the value of variable i being in the range of [1, N], performing the following cycle operation until the value of variable i decreases from N to 1, and in the situation of i=1, after calculating the corresponding value of N as the information of the time scale corresponding to coded value with the specified number of bits, the cycle operation ends;

wherein the cycle operation comprises:

obtaining the high position of Mid through the mask $(2^i - \Sigma_{k=0}^{2^{i-1}-1} 2^{2^{i-1}-k} - 1)$ shifting the obtained high position to the right by 2i−1 bits to obtain Mid0, determining if Mid0 is 0; if Mid0 is not 0 at this time, Mid=Mid0, and N stays the same, and then performing the next cycle; if the Mid0 is 0, then calculating Mid=Mid& $(\Sigma_{k=0}^{2^{i-1}-1} 2^{2^{i-1}-k})$, N=N+$2^{i-1}$ through the mask, then performing the next cycle.

13. A decoding method, comprising:

determining, via a calculation device, the coded value with the specified number of bits to be decoded, the coded value being obtained using the method of claim 1;

determining, via the calculation device, information of the time scale corresponding to the coded value to be decoded;

according to the information of the time scale corresponding to the coded value to be decoded, and the specified number of bits, decoding, via the calculation device, the coded value to be decoded to corresponding time information, wherein determining, via the calculation device, the information of the time scale corresponding to the coded value to be decoded comprises:

determining, via the calculation device, parity of the coded values to be decoded;

when determining the coded value with the specified number of bits is odd, calculating, via the calculation device, Mid by Mid=(MTc−1)^(MTc+1), wherein, MTc is the coded value with the specified number of bits;

for Mid, under the situation that initializing N=0 and the value of variable i being in the range of [1, N], performing, via the calculation device, the following cycle operation until the value of variable I decreases from N to 1, and in of the situation that i=1, after calculating the corresponding value of N as the coded value with the specified number of bits corresponding to the information of the time scale, the cycle operation ends;

wherein the cycle operation comprises:

obtaining the high position of Mid by the mask $(2^i - \Sigma_{k=0}^{2^{i-1}-1} 2^{2^{i-1}-k} - 1)$, determining if Mid0 is 0; if Mid0 is not 0 at this time, Mid=Mid0, and N stays the same, and then performing the next cycle; if the Mid0 is 0, then calculating Mid=Mid& $(\Sigma_{k=0}^{2^{i-1}-1} 2^{2^{i-1}-k})$, N=N+$2^{i-1}$ through the mask, then performing the next cycle.

14. The method in claim 13, comprising:

saving, outputting, or displaying the time information.

15. A device for processing time information, comprising:

a processor; and a computer-readable storage medium comprising instructions that when executed by the processor cause:

a time information determining unit to be configured for obtaining, via at least one of a file system, a database, or an input at a user interface, the time information to be coded;

a coding unit to be configured for encoding (i) the time information into a first integer represented by a specified number of bits under a first time scale and (ii) the first integer into a second integer represented by the same number of bits under a second time scale, wherein the second time scale is (i) different from the first time scale and (ii) indicated by a parameter that corresponds to the second time scale, the second integer being as a coded value under the second time scale for the time information; and storage, via the file system or database, of the second integer; and after the storage, performance of a search, wherein the encoding of the first integer into the second integer comprises:

shifting the first integer to the left by one bit, to obtain the shifted first integer T'c;

calculating DetaT according to DetaT=1<<(m−1−N), wherein, N is the information for the second time; and calculating MTc as the second integer according to MTc=(T'c>>(m−N))<<(m−N)+DetaT−1, wherein m is the specified number of bits.

16. A coded value searching device, comprising:

a processor; and a computer-readable storage medium comprising instructions that when executed by the processor cause:

a coded value determining unit to be configured for determining a coded value with specified number of bits;

an information determining unit to be configured for determining information of the time scale corresponding to the coded value with the specified number of bits;

searching unit to be configured for searching the target coded value corresponding to the coded value with the specified number of bits according to the information of the time scale corresponding to the coded value of the specified number of bits;

wherein, the target coded value and the coded value with the specified number of bits are obtained by coding the same time information through the coding method for time information of claim 1, wherein searching a target coded value in association with the coded value with the specified number of bits according to the information of the time scale corresponding to the coded value with the specified number of bits comprises:
  according to the information of the time scale corresponding to the coded value with the specified number of bits, searching the coded value with the time scale smaller than the time scale of the coded value with the specified number of bits; or
  according to the information of the time scale corresponding to the coded value with the specified number of bits, searching the coded value with the time scale greater than the time scale of the coded value with the specified number of bits.

17. A decoding device, comprising:
  a processor; and
  a computer-readable storage medium comprising instructions that when executed by the processor cause:
    a coded value determining unit to be configured for determining the coded value with the specified number of bits to be decoded, the coded value being obtained using the method of claim 1;
    time scale determining unit to be configured for determine the information of the time scale corresponding to the coded value to be decoded;
    decoding implementation unit to be configured for decoding the coded value to be decoded into the corresponding time information according to the information of the time scale corresponding to the coded value to be decoded, and the specified number of bits,
  wherein determining the information of the time scale corresponding to the coded value to be decoded comprises:
    determining the parity of the coded values to be decoded;
    when determining the coded value with the specified number of bits is odd, calculating Mid by Mid=(MTc−1)^(MTc+1), wherein, MTc is the coded value with the specified number of bits;
    for Mid, under the situation that initializing N=0 and the value of variable i being in the range of [1, N], performing the following cycle operation until the value of variable I decreases from N to 1, and in of the situation that i=1, after calculating the corresponding value of N as the coded value with the specified number of bits corresponding to the information of the time scale, the cycle operation ends;
  wherein the cycle operation comprises:
    obtaining the high position of Mid by the mask ($2^i - \Sigma_{k=0}^{2^{i-1}-1} 2^{2^{i-1}-k} - 1$), determining if Mid0 is 0; if Mid0 is not 0 at this time, Mid=Mid0, and N stays the same, and then performing the next cycle; if the Mid0 is 0, then calculating Mid=Mid& ($\Sigma_{k=0}^{2^{i-1}-1} 2^{2^{i-1}-k}$), N=N+$2^{i-1}$ through the mask, then performing the next cycle.

* * * * *